(12) United States Patent
Abramskiehn et al.

(10) Patent No.: US 8,670,534 B2
(45) Date of Patent: Mar. 11, 2014

(54) INITIATING A TELEPHONIC CONNECTION

(75) Inventors: Dario R. Abramskiehn, New York, NY (US); John R. Dingler, Dallas, GA (US); Blaine H. Dolph, Western Springs, IL (US); Kelly E. Songer, New York, NY (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 13/307,225

(22) Filed: Nov. 30, 2011

(65) Prior Publication Data

US 2013/0136246 A1    May 30, 2013

(51) Int. Cl.
    *H04M 1/56*     (2006.01)

(52) U.S. Cl.
    USPC ...................................... 379/142.01; 455/466

(58) Field of Classification Search
    USPC ............. 379/142.01–142.04, 142.06, 142.08; 370/352, 389; 455/414.1, 415, 466
    See application file for complete search history.

(56) References Cited

U.S. PATENT DOCUMENTS

| | | | |
|---|---|---|---|
| 5,615,213 A * | 3/1997 | Griefer | 370/412 |
| 6,192,116 B1 | 2/2001 | Mayak | |
| 6,728,238 B1 * | 4/2004 | Long et al. | 370/352 |
| 7,274,781 B2 | 9/2007 | Lipton et al. | |
| 7,561,676 B2 | 7/2009 | Fernandes et al. | |
| 2009/0252303 A1 | 10/2009 | Agarwal | |
| 2011/0014932 A1 * | 1/2011 | Estevez | 455/466 |
| 2011/0026701 A1 * | 2/2011 | Kirchhoff et al. | 379/207.13 |
| 2011/0135075 A1 | 6/2011 | Hubner et al. | |
| 2011/0150191 A1 | 6/2011 | Trinh et al. | |

* cited by examiner

*Primary Examiner* — Oleg Asanbayev
(74) *Attorney, Agent, or Firm* — Matthew Chung; Hoffman Warnick LLC

(57) ABSTRACT

A solution for initiating a telephonic connection is provided. A calling user can provide data identifying a receiving device and corresponding to a call message. In response to requesting initiation of the telephonic connection, the length of the call message can be determined, and a transmission solution for the call message can be selected based on the length. When the length is sufficiently short, the call message can be included in caller ID information for the telephonic connection. When the length is longer, the call message can be transmitted as a data message and initiation of the telephonic connection can subsequently take place after a delay.

13 Claims, 6 Drawing Sheets

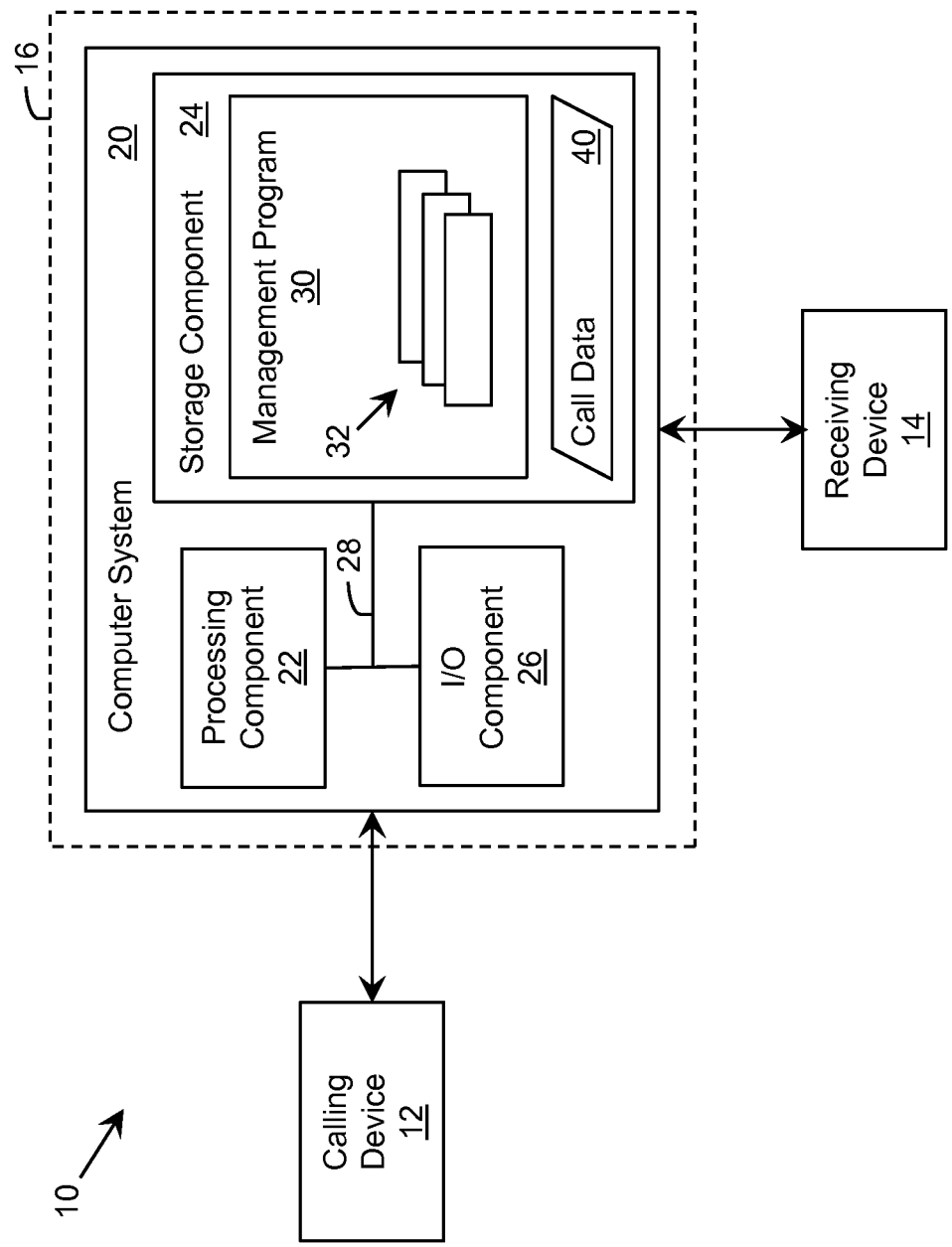

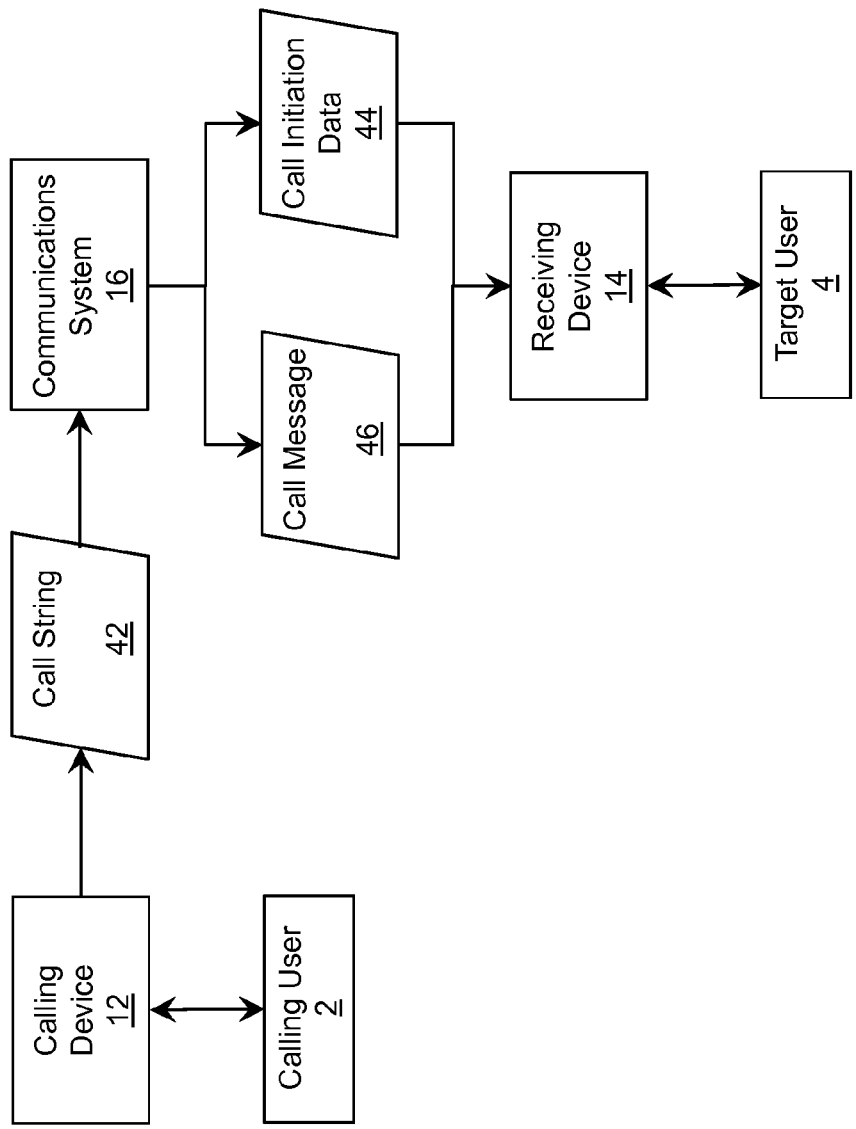

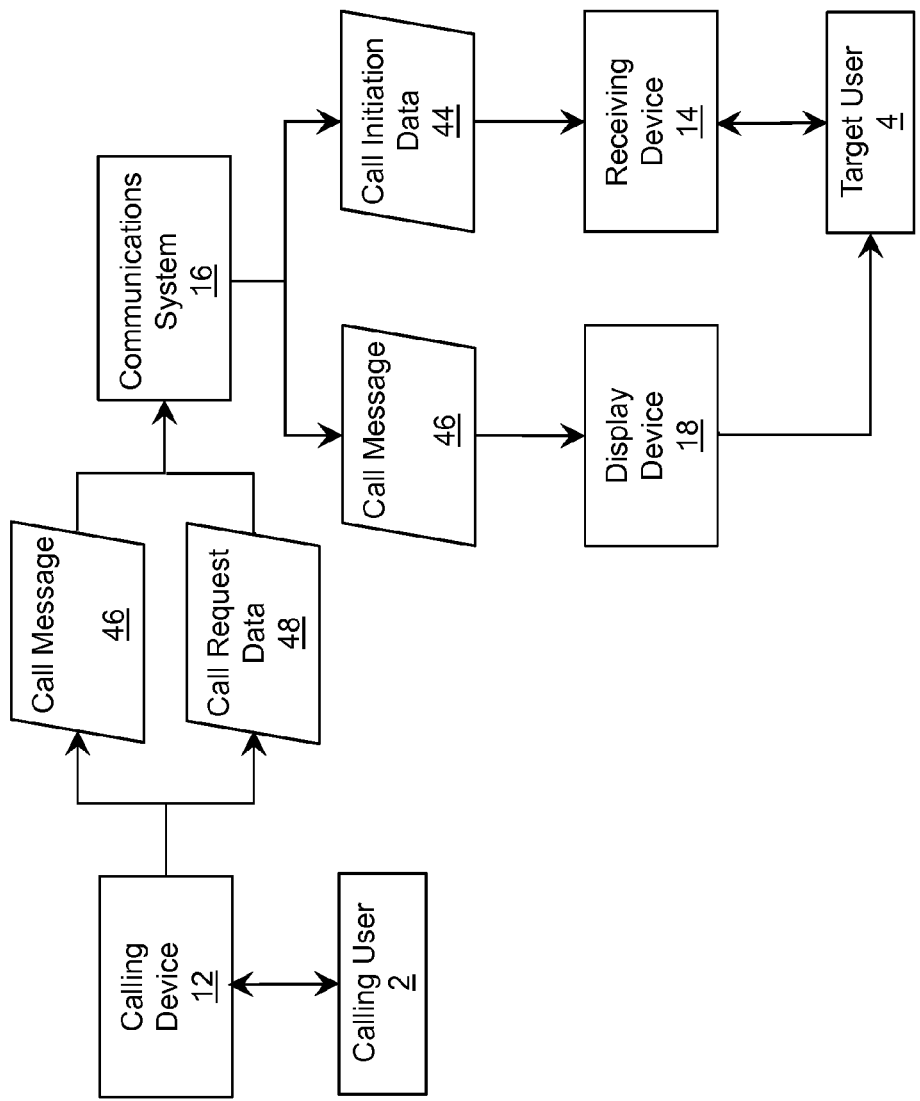

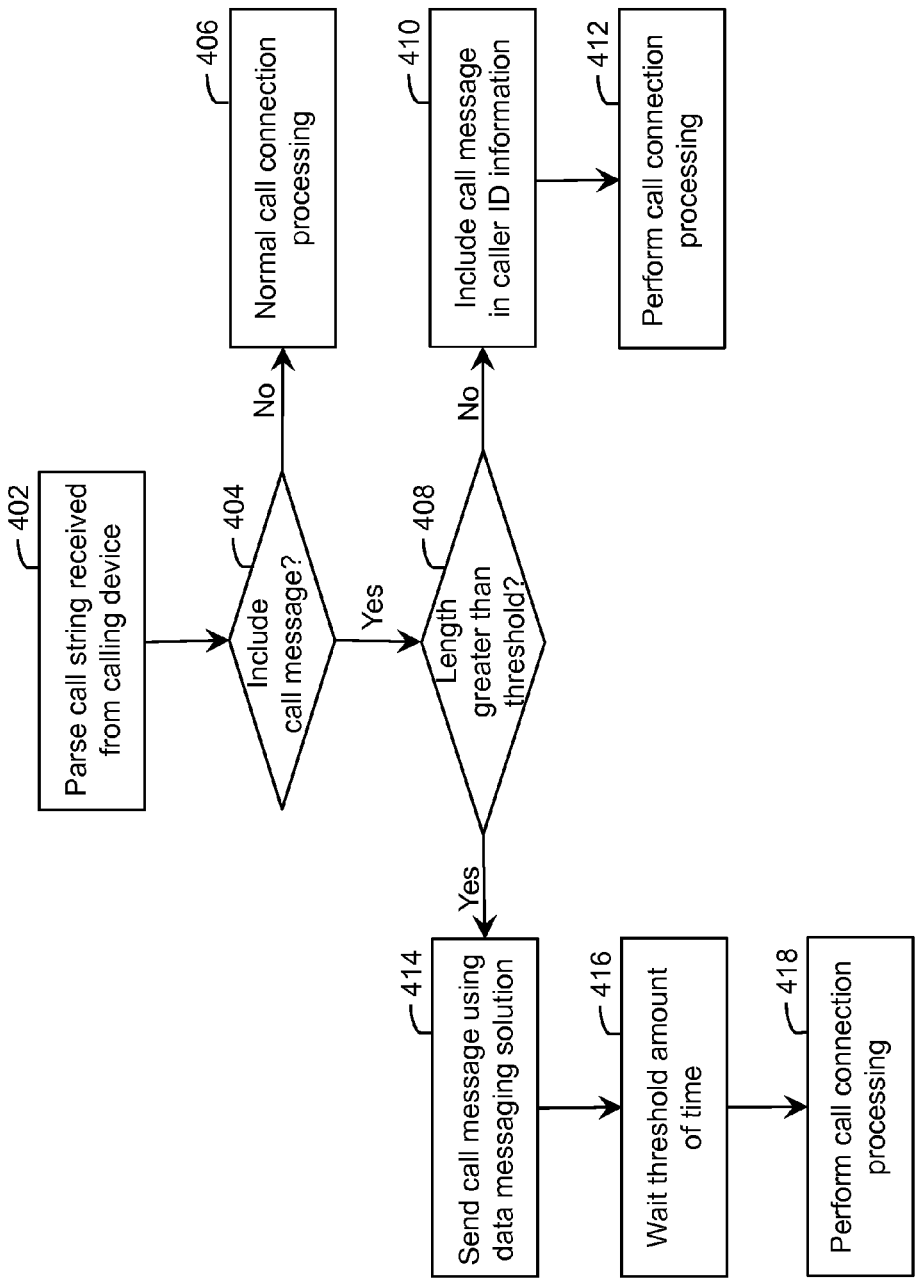

INITIATING A TELEPHONIC CONNECTION

TECHNICAL FIELD

The disclosure relates generally to telephonic connections, such as telephone calls, and more particularly, to an approach for managing call message transmission while initiating a telephonic connection.

BACKGROUND ART

Frequently, when a person receives a call, he/she does not know the urgency of the call and/or the desired topic of conversation. A problem occurs when the person is otherwise preoccupied with another task, such as on another call, in a meeting, or the like. Even with caller ID information being displayed to the person, he/she may not have sufficient information to know whether to break away from the task to answer the call or to allow voicemail to handle the call. For example, the calling individual may simply prefer to chat with the person on the phone, rather than via email or text messaging, but does not want to interrupt the person if he/she is otherwise preoccupied.

Some approaches have been proposed to address this situation. In one approach, an end user can input a message followed by a destination number into his/her phone. The message and destination number are then sent to a central office, which can attach the message to the caller ID or caller ID-call waiting information to be transmitted to the phone corresponding to the destination number. In another approach, messages of a pre-specified length and/or having a pre-specified prefix can be processed. In still another approach, a code can be entered to enable the insertion of corresponding text into the caller ID information. In a previous approach, ancillary information can be communicated along with initiating a call using a separate channel, such as an Internet Protocol (IP) communications channel or as a text message using the short message service (SMS) protocol.

SUMMARY OF THE INVENTION

Aspects of the invention provide a solution for initiating a telephonic connection. A calling user can provide data identifying a receiving device and corresponding to a call message. In response to requesting initiation of the telephonic connection, the number of characters in the call message can be determined, and a transmission solution for the call message can be selected based on the number of characters. When the length is sufficiently short, the call message can be included in caller ID information for the telephonic connection. When the length is longer, the call message can be transmitted as a data message and initiation of the telephonic connection can subsequently take place after a delay.

A first aspect of the invention provides a method of initiating a telephonic connection, the method comprising: receiving call request data identifying a receiving device and message data corresponding to an alphanumeric call message on a computer system; determining a length of the call message based on the message data using the computer system in response to the receiving; in response to determining the length of the call message as less than or equal to a threshold length, initiating the telephonic connection between a calling device and the receiving device using the call request data, wherein the call message is included in caller ID information for the telephonic connection; and in response to determining the length of the call message as greater than the threshold length: transmitting a data message including the call message for processing by a display device associated with at least one of: the call request data or a contact associated with the call request data; and initiating the telephonic connection between the calling device and the receiving device using the call request data after delaying for a threshold amount of time after the transmitting.

A second aspect of the invention provides a system comprising: a computer system for initiating a telephonic connection by performing a method comprising: receiving call request data identifying a receiving device and message data corresponding to an alphanumeric call message on a computer system; determining a length of the call message based on the message data using the computer system in response to the receiving; in response to determining the length of the call message as less than or equal to a threshold length, initiating the telephonic connection between a calling device and the receiving device using the call request data, wherein the call message is included in caller ID information for the telephonic connection; and in response to determining the length of the call message as greater than the threshold length: transmitting a data message including the call message for processing by a display device associated with at least one of: the call request data or a contact associated with the call request data; and initiating the telephonic connection between the calling device and the receiving device using the call request data after delaying for a threshold amount of time after the transmitting.

A third aspect of the invention provides a computer program product comprising program code embodied in at least one computer-readable medium, which when executed, enables a computer system to implement a method of initiating a telephonic connection, the method comprising: receiving call request data identifying a receiving device and message data corresponding to an alphanumeric call message on a computer system; determining a length of the call message based on the message data using the computer system in response to the receiving; in response to determining the length of the call message as less than or equal to a threshold length, initiating the telephonic connection between a calling device and the receiving device using the call request data, wherein the call message is included in caller ID information for the telephonic connection; and in response to determining the length of the call message as greater than the threshold length: transmitting a data message including the call message for processing by a display device associated with at least one of: the call request data or a contact associated with the call request data; and initiating the telephonic connection between the calling device and the receiving device using the call request data after delaying for a threshold amount of time after the transmitting.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 1 shows an illustrative environment for initiating and managing a telephonic connection according to an embodiment.

FIGS. 2A-2C show illustrative data flow diagrams according to alternative embodiments.

FIG. 3 shows an illustrative process for initiating a telephonic connection according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 2A:
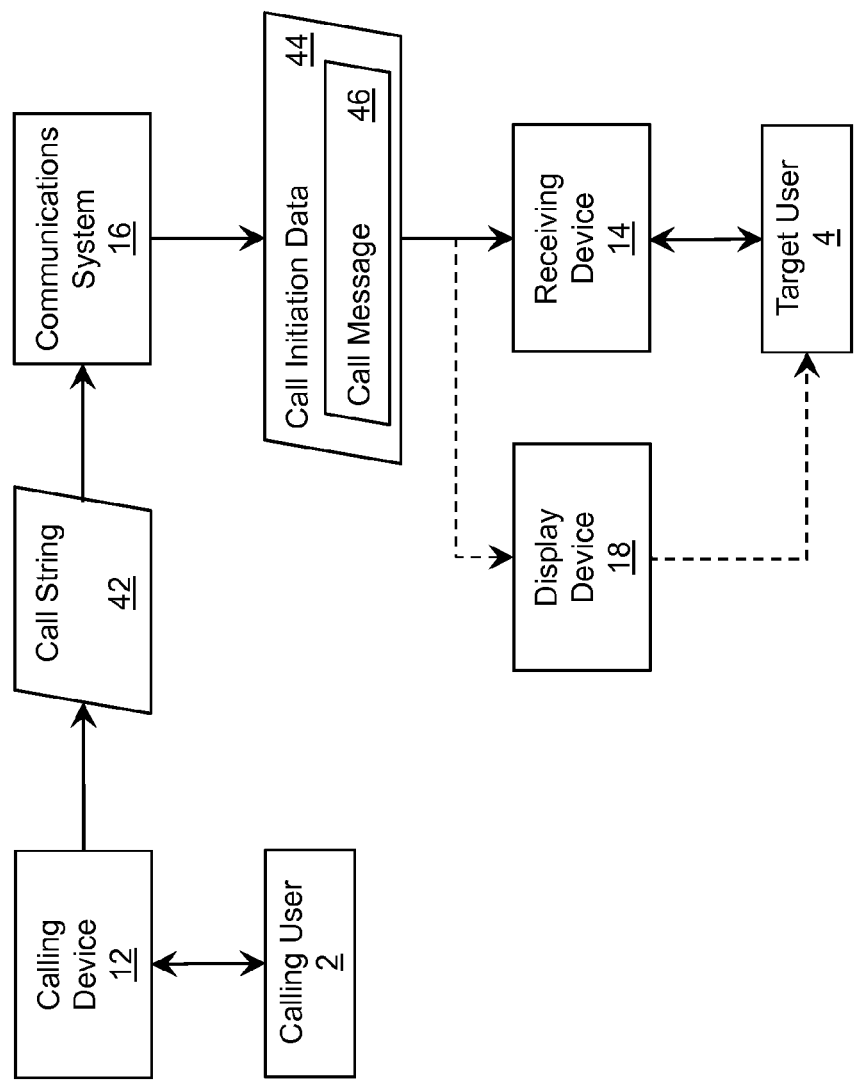

As indicated above, aspects of the invention provide a solution for initiating a telephonic connection. A calling user can provide data identifying a receiving device and corresponding to a call message. In response to requesting initiation of the telephonic connection, the number of characters in the call message can be determined, and a transmission solution for the call message can be selected based on the number of characters. When the length is sufficiently short, the call message can be included in caller ID information for the telephonic connection. When the length is longer, the call message can be transmitted as a data message and initiation of the telephonic connection can subsequently take place after a delay. As used herein, unless otherwise noted, the term "set" means one or more (i.e., at least one) and the phrase "any solution" means any now known or later developed solution.

Turning to the drawings, FIG. 1 shows an illustrative environment 10 for initiating and managing a telephonic connection according to an embodiment. To this extent, environment 10 includes a communications system 16 comprising a computer system 20 that can perform a process described herein in order to initiate and manage a telephonic connection between a calling device 12 and a receiving device 14. In particular, computer system 20 is shown including a management program 30, which makes computer system 20 operable to initiate and manage a telephonic connection by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as management program 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user (not shown) to interact with computer system 20 and/or one or more communications devices to enable a system user, such as devices 12, 14, to communicate with computer system 20 using any type of communications link. To this extent, management program 30 can manage a set of interfaces (e.g., graphical user interface(s), application program interface, and/or the like) that enable human and/or system users to interact with management program 30. Further, management program 30 can manage (e.g., store, retrieve, create, manipulate, organize, present, etc.) the data, such as call data 40, using any solution.

In any event, computer system 20 can comprise one or more general purpose computing articles of manufacture (e.g., computing devices) capable of executing program code, such as management program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, management program 30 can be embodied as any combination of system software and/or application software.

Furthermore, management program 30 can be implemented using a set of modules 32. In this case, a module 32 can enable computer system 20 to perform a set of tasks used by management program 30, and can be separately developed and/or implemented apart from other portions of management program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of computer system 20.

When computer system 20 comprises multiple computing devices, each computing device can have only a portion of management program 30 fixed thereon (e.g., one or more modules 32). However, it is understood that computer system 20 and management program 30 are only representative of various possible equivalent computer systems that may perform a process described herein. To this extent, in other embodiments, the functionality provided by computer system 20 and management program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Furthermore, while performing a process described herein, computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

As discussed herein, management program 30 enables computer system 20 to initiate and manage telephonic connections between two devices, such as a calling device 12 and a receiving device 14. As used herein, the phrase "telephonic connection" means a physical and/or virtual connection, which provides a real time, two-way transmission of voice data between at least two individuals, e.g., a user of calling device 12 and a user of receiving device 14. The telephonic connection can be implemented using any combination of one or more communications solutions, including a telephone exchange or telephone switch (central office), a wireless communications system (e.g., a cellular network, a satellite network, and/or the like), a public and/or private computer network (e.g., using a voice over Internet Protocol (VoIP), or the like), and/or the like. To this extent, the calling device 12 and the receiving device 14 can comprise any type of computer system, which enables a user to communicate over a telephonic connection. For example, a device 12, 14 can comprise a landline telephone, a mobile telephone, a smartphone, a computing device (e.g., laptop or desktop) equipped with a microphone and speaker(s), and/or the like. It is understood that calling device 12 and receiving device 14 both can be configured to initiate and receive telephone connections using any communications solution.

As described herein, an embodiment provides an improved solution for enabling the transmission of a call message relating to a desired telephonic connection as part of a process for initiating the telephonic connection. In particular, an embodiment enables a calling party to define a call message, which can be automatically transmitted for display on a device associated with a receiving device and/or a contact associated with the receiving device using an appropriate transmission solution. For example, the call message can be transmitted as part of caller ID information for the telephonic connection or as a data message, which is transmitted shortly before initiation of the telephonic connection.

FIGS. 2A-2C show illustrative data flow diagrams according to alternative embodiments. Turning to FIG. 2A, in order to request initiation of a telephonic connection, a calling user 2 can use calling device 12 to provide data uniquely identifying a receiving device 14 with which the telephonic connection is desired using any solution. For example, the calling user 2 can enter a telephone number assigned to the receiving device 14, select a contact entry from a contact list including an associated telephone number, select a stored telephone number, and/or the like.

Furthermore, the calling user 2 can use calling device 12 to provide data corresponding to a call message as part of requesting initiation of the telephonic connection. The call message can comprise any message, which the calling user 2 desires to be presented to a target user 4 as part of initiating the telephonic connection. The calling user 2 can define the call message using any solution, e.g., by entering an alphanumeric string, by selecting a pre-defined call message from a set of call messages, and/or the like.

Further details of the data flow diagram of FIG. 2A are discussed in conjunction with FIG. 3, which shows an illustrative process for initiating a telephonic connection according to an embodiment. In process 402, communications system 16 can receive a call string 42 transmitted by the calling device 12 using any solution, and parse the call string 42. Each call string 42 can include call connection data, which uniquely identifies the receiving device 14 (e.g., a telephone number, data enabling retrieval of a telephone number or other communication information from call data 40 (FIG. 1) maintained by the communications system 16, and/or the like). Additionally, a call string 42 can include call message data corresponding to a call message (e.g., an alphanumeric string of characters, data enabling retrieval of a pre-defined call message from call data 40 maintained by the communications system 16, and/or the like). Still further, the call message to be transmitted by the communication system 16 can comprise data, which enables the receiving device 14 to retrieve a pre-defined message, e.g., from data stored on the receiving device 14.

As part of parsing the call string 42, communications system 16 can determine whether the call string 42 includes call message data using any solution. For example, communications system 16 can determine whether the call string 42 exceeds a particular length, includes any data other than the call connection data, and/or the like. When communications system 16 determines call message data is included in the call string 42, communications system 16 can parse the call string 42 to extract the call connection data (e.g., the telephone number) and the call message data therefrom. In an embodiment, the call string 42 comprises a first substring corresponding to the call connection data and a second substring corresponding to the call message data (e.g., "5555551212Urgent!"). In this case, the communications system 16 can require that the call connection data substring and/or the call message data substring comprise a fixed number of digits and have a fixed location within the call string 42, thereby enabling the communications system 16 to identify the end of one substring and the beginning of the other substring.

In another embodiment, the call string 42 can further include a delimiter, such as the number (hash) sign ("#"), separating the first substring and the second substring (e.g., "5555551212#Urgent!"). In this case, the communications system 16 can extract the call connection data and the call message data from the call string 42 by identifying a position of the delimiter in the call string 42. The delimiter can be selected such that it is an invalid character for either the call connection data or the call message data. In this case, communications system 16 can require that the substring in which the delimiter is invalid (e.g., the call connection data) be the first substring in the call string 42, thereby enabling ready detection of the position of the delimiter by identifying the first occurrence of the delimiter within the call string 42. In this manner, the delimiter can be included in the other substring (e.g., the call message data) without requiring any special processing by the communications system 16, transmission of additional data in the call string 42, or limitation as to the content/length of the call message being placed on the calling user 2.

After the call string 42 has been parsed, in process 404, communications system 16 can determine whether the call string 42 includes call message data. If not, in process 406, communications system 16 can perform normal processing of the call connection data in order to initiate a telephonic connection between calling device 12 and receiving device 14.

When communications system 16 determines that the call string includes call message data, in process 408, communications system 16 can determine a number of characters in the call message based on the call message data using any solution. For example, when the call message data is the call message, communications system 16 can determine the number of characters in the call message data. Similarly, communications system 16 can use the call message data to retrieve a corresponding call message (e.g., stored as call data 40 (FIG. 1)), and determine the number of characters in the retrieved call message.

In any event, communications system 16 can compare the length of the call message to a predefined threshold length. The threshold length can correspond to a number of characters for the call message that will require communications system 16 to adjust a transmission solution utilized for transmitting the call message for presentation to the target user 4. In an embodiment, the threshold length corresponds to a number of characters available for use in the caller ID information for the telephonic connection. For example, an illustrative threshold length comprise ten bytes, which can be included within the caller ID information for the telephonic connection.

When the length of the call message does not exceed the threshold length, in process 410, communications system 16 can include the call message 46 in call initiation data 44, which communications system 16 transmits for processing by the receiving device 14 as part of initiating the telephonic connection. In an embodiment, communications system 16 includes the call message 46 in the caller ID information of the call initiation data 44 for the telephonic connection using any solution. For example, the communications system 16 can insert the call message 46 after data corresponding to a telephone number for the calling device 12.

In any event, in process 412, communications system 16 can perform the call connection processing utilizing the revised call initiation data 44 using any solution. For example, communications system 16 can transmit the call initiation data 44 as a series of signals to alert the receiving device 14 of an incoming telephone call. The series of signals can include a set of signals encoding the caller ID information, which can include the call message 46. The receiving device 14 can process the call initiation data 44, e.g., by ringing, generating a call waiting indication when the receiving device 14 is currently in use, and/or the like.

Furthermore, when the receiving device 14 includes a display, the display can include data corresponding to the caller ID information, such as the telephone number of the calling device 12, contact information corresponding to the telephone number, the call message 46, a pre-defined message corresponding to the call message 46, and/or the like. Additionally, one or more display devices 18, which are associated with the telephone number can display data corresponding to the caller ID information. For example, a personal computer, a television, and/or the like, can be configured to display data corresponding to the caller ID information for an incoming telephone call.

In response to determining that the length of the call message 46 is greater than the threshold, communications system 16 can use an alternative communications solution for providing the call message 46 for presentation to the target user 4. To this extent, FIG. 2B shows another illustrative data flow diagram according to an embodiment. Referring to FIGS. 2B and 3, in process 414, communications system 16 can transmit the call message 46 using a data messaging solution, such as a text message, an instant message, an email, and/or the like, for processing by the receiving device 14 (and/or a display device 18 (FIG. 2A) associated therewith). After transmitting the call message 46, in process 416, communications system 16 can wait a threshold amount of time (e.g., five seconds) in order to enable the call message 46 to be received on the receiving device 14 and presented to the target user 4.

In process 418, communications system 16 can perform the call connection processing using any solution. For example, communications system 16 can transmit the call initiation data 44 as a series of signals to alert the receiving device 14 of an incoming telephone call. The series of signals can include a set of signals encoding the caller ID information. In an embodiment, the caller ID information comprises standard caller ID information. In another embodiment, the caller ID information includes data related to the call message 46. For example, communications system 16 can include a message for presentation to the target user 4 in the call initiation data 44. The message can comprise a portion of the call message 46, such as the first characters of the call message 46 that are less than the threshold value. Alternatively, communications system 16 can include a message instructing the target user 4 to view the related call message 46 that was previously sent (e.g., "See text"). Still further, communications system 16 can include command data in the call initiation data 44, which instructs the receiving device 14 to present a related data message including the call message 46 along with the caller ID information for the telephone call. The command data can be included as part of the caller ID information, as an additional field in the call initiation data 44, and/or the like.

The receiving device 14 can process the call message 46 and the call initiation data 44 using any solution. For example, in response to receiving the call message 46, the receiving device 14 can alert the target user 4 of the new call message 46, present the call message 46 to the target user 4, and/or the like. Similarly, the receiving device 14 can process the call initiation data 44, e.g., by ringing, generating a call waiting indication when the receiving device 14 is currently in use, and/or the like. Furthermore, receiving device 14 can be configured to process a command in the call initiation data 44, which instructs the receiving device 14 to present a related data message, which includes the call message 46, to the target user 4 as part of the call initiation process.

While communications system 16 can be configured to receive and process a call string 42 for providing a call message 46 for presentation to a target user 4 as part of a call initiation process, it is understood that calling device 12 can be configured to provide the call message 46. To this extent, FIG. 2C shows an illustrative flow diagram according to another embodiment. In this case, the calling user 2 provides call message data 48 corresponding to a call message 46, and call initiation data uniquely identifying the receiving device 14 using any solution. In response to the calling user 2 requesting initiation of a telephonic connection, calling device 12 can obtain the call message 46, determine a length of the call message 46 and, when the length exceeds a threshold length, transmit the call message 46 for processing by the communications system 16 using any data messaging solution (e.g., a text message, an instant message, an email, and/or the like). Upon receiving the call message 46, communications system 16 can transmit the call message 46 for presentation to target user 4 using any solution.

Subsequently, calling device 12 can delay/wait for a threshold amount of time after transmitting the call message 46, and initiate the telephonic connection with the receiving device 14, e.g., by transmitting call request data 48 for processing by communications system 16. In response to receiving the call request data 48 from the calling device 12, communications system 16 can initiate the telephonic connection with the receiving device 14, e.g., by providing call initiation data 44 for processing by the receiving device 14 as described herein. The call request data 48 can comprise data uniquely identifying the receiving device 14. Furthermore, the call request data 48 can include caller ID information provided by the calling device 12, which can include a telephone number corresponding to the calling device 12, data corresponding to the call message 46, and/or the like. When calling device 12 determines that the call message 46 is less than or equal to the threshold length, calling device 12 can include the call message 46 as part of the caller ID information provided to communications system 16.

As also illustrated in FIG. 2C, calling device 12 and/or communications system 16 can transmit a data message including the call message 46 for processing by a display device 18 distinct from the receiving device 14. To this extent, the display device 18 can be separately identified from the receiving device 14. For example, the display device 18 can comprise a personal computing device being utilized by the target user 4, while the receiving device 14 can comprise a telephone (e.g., mobile phone, landline phone, or the like). In an embodiment, calling device 12 and/or communications system 16 can include call data 40 (FIG. 1), which indicates when the receiving device 12 does not support the presentation of caller ID information (e.g., based on information provided by the calling user 2, the target user 4, the receiving device 14, and/or the like). In this case, the calling device 12 and/or the communications system 16 can separately transmit the call message 46 regardless of the length of the call message 46.

As described herein, calling device 12 can enable the calling user 2 to identify the receiving device 14 and/or the target user 4 and enter a call message 46 using any solution. In an embodiment, calling device 12 can provide a graphical user interface enabling the calling user 2 to enter a call message 46 after identifying the receiving device 14 and/or the target user 4. For example, calling device 12 can be configured to enable a calling user 2 to enter a telephone number, a delimiter, and an alphanumeric string (e.g., "5555551212#Urgent!"). Upon the calling user 2 requesting initiation of the telephonic connection, the calling device 12 can process the entry and/or provide the entry as a call string 42 for processing by communications system 16.

Figure 4B:
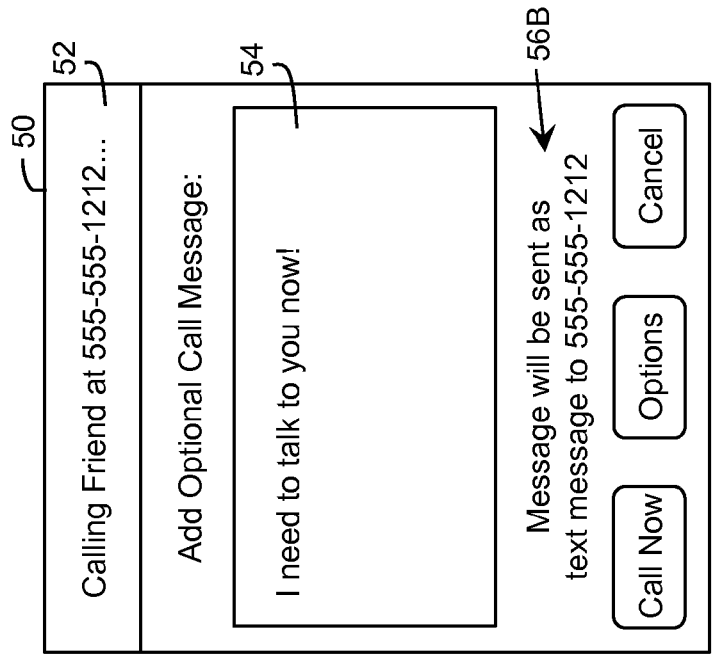
FIGS. 4A and 4B show an illustrative message user interface according to an embodiment.
Figure 4A:
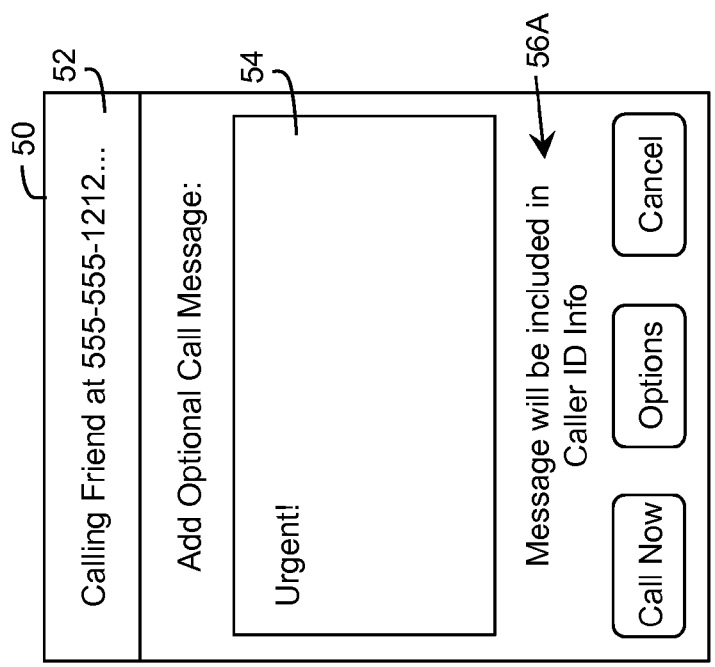

FIGS. 4A and 4B show an illustrative message user interface 50, which can be generated by calling device 12, according to an embodiment. For example, calling device 12 can enable a calling user 2 to enter a telephone number, select a contact, and/or the like, for a desired telephonic connection using any solution. The calling device 12 can include a user interface control, such as a menu option, virtual/physical button, and/or the like, which enables the calling user 2 to request to enter a call message 46 for the telephonic connection. In response to selection of the user interface control, the calling device 12 can provide the message user interface 50 for presentation to the calling user 2.

As illustrated, the message user interface 50 can include a call information portion 52 for displaying information about the target user 4 and/or the receiving device 14, such as a contact name and telephone number. Furthermore, the message user interface 50 can include a call message definition portion, which includes a user interface control 54 for enabling the calling user 2 to generate the call message 46. In an embodiment, the user interface control 54 comprises a text box, which enables the calling user 2 to enter any alphanumeric call message 46 (FIG. 2A).

As described herein, the call message 46 may be transmitted for presentation to the target user 4 using one of at least two options. To this extent, the message user interface 50 further can include an indication of whether the currently entered call message 46 will be included in the caller ID information of the call initiation data 44 (FIG. 2A) or as a data message transmitted prior to processing the call initiation data 44. For example, message user interface 50 can include a description of how the call message 46 will be provided. As illustrated in FIG. 4A, the description 56A indicates that the call message 46 will be included in the caller ID information. As illustrated in FIG. 4B, the description 56B indicates that the call message 46 will be sent as a text message. It is understood that calling device 12 (FIG. 1) can implement any type of message user interface, including enabling the user to enter the call string 42 (FIG. 2A) directly. Additionally, it is understood that calling device 12 can implement any combination of one or more forms of feedback to alert the calling user 2 (FIG. 1) of the transmission solution to be utilized for a currently defined call message 46, including for example, altering a color, font attribute, and/or the like, of the call message 46, generating an audible alert, and/or the like.

It is understood that the various data flow diagrams, processes, and user interfaces described herein are only illustrative. To this extent, various alterations and combinations of the features shown and described herein can be made. Furthermore, it is understood that initiation of a telephonic connection described herein may not result in an actual telephonic connection (e.g., the target user 4 (FIG. 1) may decide not to answer). Additionally, it is understood that more than one receiving device 14 (FIG. 1) can be utilized to form a telephonic connection (e.g., more than one landline telephone). In any event, in response to the target user 4 using the receiving device 14 to make the telephonic connection, communications system 16 can manage the telephonic connection using any solution.

While shown and described herein as a method and system for initiating and managing a telephonic connection, it is understood that aspects of the invention further provide various alternative embodiments. For example, in one embodiment, the invention provides a computer program fixed in at least one computer-readable medium, which when executed, enables a computer system to initiate and manage a telephonic connection. To this extent, the computer-readable medium includes program code, such as management program 30 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as management program 30 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for initiating and managing a telephonic connection. In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of initiating a telephonic connection, the method comprising:
    receiving call request data identifying a receiving device and message data corresponding to an alphanumeric call message on a computer system,
    wherein the computer system is distinct from a calling device, the receiving including receiving a call string, wherein the call string includes a first substring corresponding to the call request data and a second substring corresponding to the message data, the method further comprising extracting the message data from the call string using the computer system in response to the receiving;
    wherein the alphanumeric call message includes a user input, non-predetermined string of characters;
    determining a length of the alphanumeric call message based on the message data using the computer system in response to the receiving;
    in response to determining the length of the alphanumeric call message as less than or equal to a threshold length, initiating the telephonic connection between the calling device and the receiving device using the call request data, wherein the alphanumeric call message is included in caller ID information for the telephonic connection; and
    in response to determining the length of the alphanumeric call message as greater than the threshold length:
    transmitting a data message including the alphanumeric call message for processing by a display device associated with at least one of: the call request data or a contact associated with the call request data; and
    initiating the telephonic connection between the calling device and the receiving device using the alphanumeric call request data after delaying for a threshold amount of time after the transmitting, and adding data corresponding to the data message in the caller ID information for the telephonic connection, and in response to determining the length of the alphanumeric call message as greater than the threshold length.

2. The method of claim 1, further comprising providing a message user interface for enabling a user of the calling device to generate the alphanumeric call message using the calling device.

3. The method of claim 2, further comprising providing a user interface control for enabling the user of the calling device to initiate the message user interface after providing the call request data.

4. The method of claim 2, wherein the message user interface provides an indication of whether the alphanumeric call message will be included in the caller ID information or as the data message.

5. The method of claim 1, wherein the call string further includes a delimiter separating the first substring and the second substring, and wherein the extracting includes identifying a position of a first occurrence of the delimiter in the call string.

6. A computer system comprising:
    at least one computing device for initiating a telephonic connection by performing a method comprising:
    receiving call request data identifying a receiving device and message data corresponding to an alphanumeric call message on a computer system,
    wherein the computer system is distinct from a calling device, the receiving including receiving a call string, wherein the call string includes a first substring corresponding to the call request data and a second substring corresponding to the message data, the method further comprising extracting the message data from the call string using the computer system in response to the receiving;
    wherein the alphanumeric call message includes a user input, non-predetermined string of characters;
    determining a length of the alphanumeric call message based on the message data using the computer system in response to the receiving;
    in response to determining the length of the alphanumeric call message as less than or equal to a threshold length, initiating the telephonic connection between the calling device and the receiving device using the call request data, wherein the alphanumeric call message is included in caller ID information for the telephonic connection; and
    in response to determining the length of the alphanumeric call message as greater than the threshold length:
    transmitting a data message including the alphanumeric call message for processing by a display device associated with at least one of: the call request data or a contact associated with the call request data; and
    initiating the telephonic connection between the calling device and the receiving device using the call request data after delaying for a threshold amount of time after the transmitting, and adding data corresponding to the data message in the caller ID information for the telephonic connection, and in response to determining the length of the alphanumeric call message as greater than the threshold length.

7. The system of claim 6, the method further comprising providing a message user interface for enabling a user of the calling device to generate the alphanumeric call message using the calling device.

8. The system of claim 7, the method further comprising providing a user interface control for enabling the user of the calling device to initiate the message user interface after providing the call request data.

9. The system of claim 7, wherein the message user interface provides an indication of whether the alphanumeric call message will be included in the caller ID information or as the data message.

10. A computer program product comprising program code embodied in at least one non-transitory computer-readable storage medium, which when executed, enables a computer system to implement a method of initiating a telephonic connection, the method comprising:
    receiving call request data identifying a receiving device and message data corresponding to an alphanumeric call message on a computer system,
    wherein the computer system is distinct from a calling device, the receiving including receiving a call string, wherein the call string includes a first substring corresponding to the call request data and a second substring corresponding to the message data, the method further comprising extracting the message data from the call string using the computer system in response to the receiving;
    wherein the alphanumeric call message includes a user input, non-predetermined string of characters; determining a length of the alphanumeric call message based on the message data using the computer system in response to the receiving;

in response to determining the length of the alphanumeric call message as less than or equal to a threshold length, initiating the telephonic connection between the calling device and the receiving device using the call request data, wherein the alphanumeric call message is included in caller ID information for the telephonic connection; and in response to determining the length of the alphanumeric call message as greater than the threshold length: transmitting a data message including the alphanumeric call message for processing by a display device associated with at least one of: the call request data or a contact associated with the call request data; and initiating the telephonic connection between the calling device and the receiving device using the call request data after delaying for a threshold amount of time after the transmitting, and adding data corresponding to the data message in the caller ID information for the telephonic connection, and in response to determining the length of the alphanumeric call message as greater than the threshold length.

11. The program product of claim 10, the method further comprising providing a message user interface for enabling a user of the calling device to generate the alphanumeric call message using the calling device.

12. The program product of claim 11, the method further comprising providing a user interface control for enabling the user of the calling device to initiate the message user interface after providing the call request data.

13. The program product of claim 11, wherein the message user interface provides an indication of whether the alphanumeric call message will be included in the caller ID information or as the data message.

* * * * *